Oct. 12, 1948.　　　C. G. MARQUARDT　　　2,451,397
APPAREL BELT OR CHAIN
Filed Sept. 28, 1945
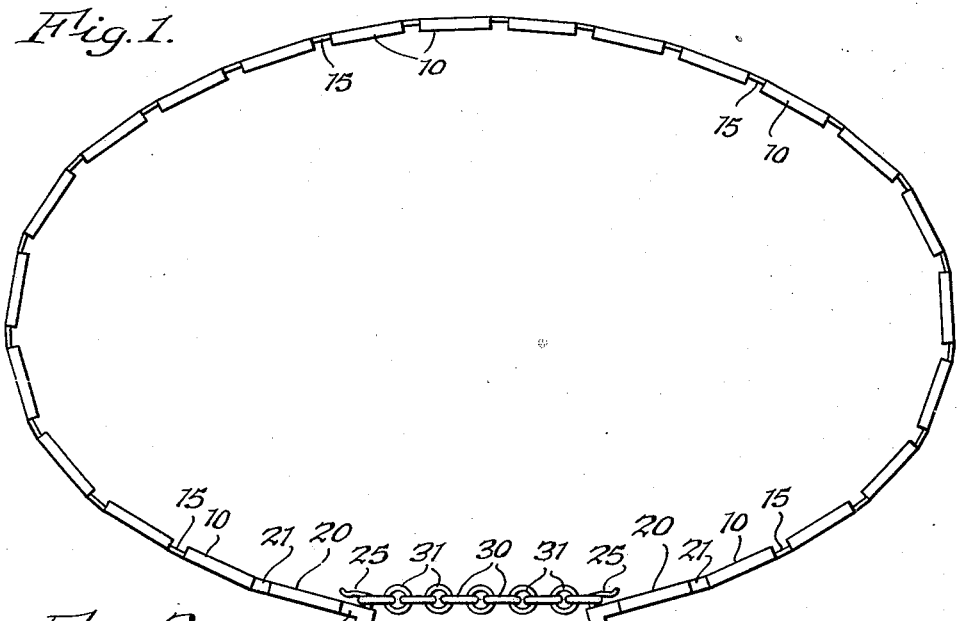
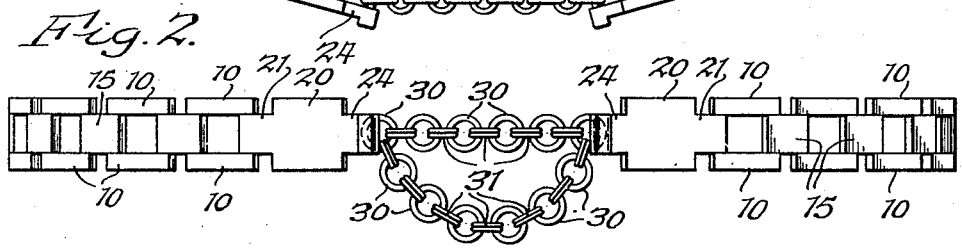
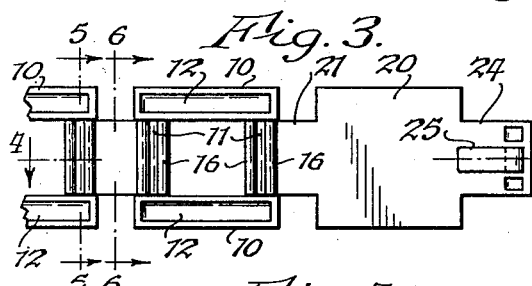
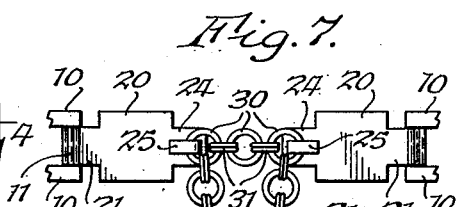
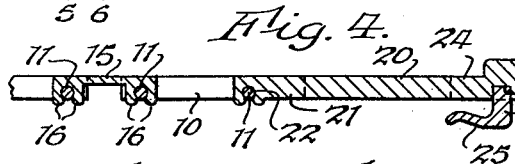
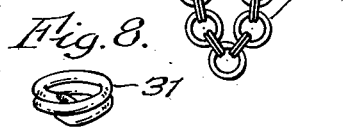
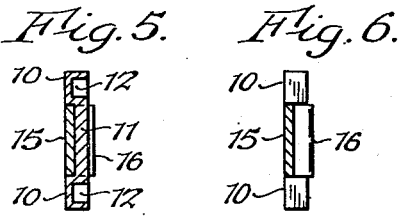
INVENTOR
Carl G. Marquardt,
BY
Parker, Prochnow & Farmer,
ATTORNEYS Patented Oct. 12, 1948

2,451,397

UNITED STATES PATENT OFFICE 2,451,397

APPAREL BELT OR CHAIN

Carl G. Marquardt, Chatham, N. J., assignor to Sterling Injection Molding, Inc., Buffalo, N. Y.

Application September 28, 1945, Serial No. 619,211

7 Claims. (Cl. 2—338)

1

This invention relates to improvements in apparel belts or chainlike articles intended particularly for ornamentation of ladies' wearing apparel.

One of the objects of this invention is to provide a belt or chain of ornamental appearance, which can be readily manufactured of molded plastic materials. Another object is to provide a belt or chainlike article of this type, the links of which are constructed so that they can be readily assembled to form a complete article. A further object is to provide a belt of this kind with buckles or fastening members of improved and simplified construction for use in connecting the ends of the belt. A further object is to provide a belt of this type with an improved connection between the ends of the belt, whereby the length of the belt may be varied to suit different wearers. Another object is to provide a belt of this type in which the main links are cored out so that they can be made of light weight and so that all of the outer surfaces of the belt will be free from projections or roughness produced by the knock-out or ejector pins of the molding apparatus. Other objects and advantages of this invention will appear from the following description and claims.

In the accompanying drawings, which illustrate by way of example one embodiment of this invention:

Fig. 1 is an edge view of the garment belt or chainlike article embodying this invention.

Fig. 2 is a front elevation thereof.

Fig. 3 is a rear elevation of a part of the belt.

Fig. 4 is a longitudinal central sectional view thereof, on line 4—4, Fig. 3.

Figs. 5 and 6 are transverse sectional views thereof, respectively on lines 5—5 and 6—6, Fig. 3.

Fig. 7 is a fragmentary rear elevation of the end portions of the belt and showing the connection between the same.

Fig. 8 is a perspective view of one of the links of the connecting chain for the ends of the belt.

My improvements are shown in the accompanying drawings in the form of an ornamental garment belt, and the article will be hereinafter generally referred to as a belt, but it will be understood that my improvements may be applied to other chainlike articles, such as bracelets, necklaces, tie-backs for curtains, and for other purposes where chainlike articles may be used. It will also be understood that certain structural details of my improvements may be varied without departing from the spirit of this invention.

The belt includes alternately arranged main links and connecting links pivotally connected, and the ends of the chainlike structure of the belt are connected to a pair of buckle members which may be connected in any suitable manner, for example, by means of an endless chain which makes it possible to vary the length of the belt to a considerable extent.

The main links of the chain each comprise a pair of bar portions 10 extending lengthwise of the belt and spaced apart. These bar portions are connected adjacent to their ends by means of pivot or axle portions 11. Preferably the belt is made of molded plastic material, and the pivot or axle portions and bar portions are of such form that they may be molded in one piece. Preferably the pivot or axle portions are made of substantially circular cross section so as to form pivots or bearing pins for the connecting links. The bar portions 10 of the main links are preferably cored out or provided with longitudinally extending grooves 12 on their inner faces. This structure serves not only to lighten the links, but also has the further advantage that the usual knock-out or ejector pins of the molds which remove these links from the molds may be arranged to engage the links within the grooved portions 12 so that the outer and inner faces of the links may have smooth and uninterrupted surfaces which will not damage the fabrics of any dress or other garment in connection with which the belt may be worn. The bar portions of the links may be of any other suitable or desired shape.

The connecting links have flat body portions 15, those shown by way of example being of rectangular shape and of such width that their ends fit between the bar portions of adjacent main links. These connecting links have their end portions formed to cooperate with the pivot or axle portions 11 of the main links. In the construction shown for this purpose, each connecting link is provided adjacent to each end thereof with an undercut groove, which may be formed between a pair of ribs 16 extending from the body portion of the connecting link in a direction transverse to the length of the chain. The two ribs are spaced apart to receive between them a pivot member 11 of a main link. The undercut grooves between the ribs may be accomplished in any suitable or desired manner, and in the construction illustrated, the outer portions of the ribs 16 facing each other are slightly enlarged and extend toward each other, thus forming undercut grooves between adjacent ribs. The distance across the open ends of the grooves is slightly less than the diameter of the pivot portions of the main links, so that the main links will be held in the grooves between the ribs. These enlargements or inwardly extending portions of the ribs may be formed either by heating the ribs after molding of the same and after the pivot portions of adjacent main links have been placed between the ribs, to form the outer edges of the ribs over the pivot portions 11 of the main links, or if desired, the ribs 16 may be molded so that the space between them is in the form of an undercut groove. Many molded plastic materials are sufficiently resilient so that the pivot portions of the main links can readily be pressed into the space between adjacent ribs or past the reduced open portions of the slots. When this construction is employed, the chain can readily be formed by laying the connecting links 15 with their flat faces up, so that the ribs extend downwardly, and placed over two adjacent main links with the pivot portions of each under the grooves of the connecting link, and then pressing the connecting links downwardly into place, so that the pivot portions of the main links are in the undercut grooves. The links thus connected will freely swing about their pivotal connections and the pivot portions will be securely held in place between the ribs.

When the chain structure which has been described is used in connection with a garment belt, buckles are provided at the ends of the chainlike series of links, by means of which the ends of the belt may be connected. In the construction shown for this purpose, a pair of buckles 20 is provided and one end of each buckle is formed to cooperate with the ends of the chainlike structure. The buckles may, consequently, either be formed to connect with adjacent main links or connecting links, and in the construction illustrated, the buckles are formed to connect with main links, each buckle being provided at one end thereof with an extension 21 which is formed similar to one end of a connecting link, this extension having an undercut groove 22 molded therein into which a pivot portion 11 of a main link may enter. The other end of each buckle 20 is provided with suitable means for use in connecting the two buckles. In the construction shown for this purpose, the other end of each buckle is provided with a longitudinally extending portion 24, to the outer end of which a hook 25 may be connected. In the construction illustrated by way of example, a hook 25 is provided on each buckle and the two hooks may then engage the links of a small endless connecting chain or other connecting means for holding the belt in place. The hooks may be of any suitable structure, and in the construction illustrated, each hook is provided with a stem portion 26 which may be secured to the end extension 24 of a buckle, and for this purpose, the buckle is provided near the end thereof with a suitable hole 27 formed to receive the stem 26, and this stem may then be cemented in the hole. The result is a strong and rigid connection between the buckle and the hook, which can be very easily formed by molding the buckle and the hook. Any other means for securing the hook or other connecting device on the buckles may be employed.

The connecting chain may be of any suitable construction, and as shown is composed of a plurality of rigid links or rings 30 of a size so that the hooks may readily engage these links as shown in Fig. 7. This endless chain may be of any desired length, and is of itself of ornamental appearance and makes it possible to vary the effective length of the belt to suit the particular wearer. For example, on one person a belt may be worn with the endless chain arranged as in Fig. 7, and in which the slack part of the chain hangs down from the buckles and forms an additional ornament. If the same belt is worn on a person of larger waist measure, the endless chain may be applied as shown in Figs. 1 and 2. Consequently, the endless connecting chain provides considerable leeway in fitting a belt to wearers of different waist measure.

Preferably the alternate links 31 of the endless chain are made of portions of a coil of plastic material, at least two turns of a coil being used for each link. These links may be readily attached to the solid or disk-like links 30 by separating the coils so as to pass a rigid link 30 between the same until it is in the position shown in Figs. 1, 2 and 7. After the coil links as shown in Fig. 8 have been applied to a chain, the opening or spreading of the coil links due to pressure applied to them may be resisted by cementing the adjacent turns of the spiral together by any suitable cement. If the links are made of certain types of thermoplastic materials, the application of a small amount of solvent for the material may be used to cause the adjacent turns of the coil links to become cemented or welded together.

The garment belt described has the advantages that it is ornamental in appearance and the links can be made of a large variety of different colors by selecting appropriate plastic materials of different colors. Any desired color combinations may be used both for the main links, the connecting links and the buckles 20. The connecting links for the belts may be made of any suitable color or combinations of colors. The belt when made of plastic material is, furthermore, of very light weight and is easily cleaned by merely washing the same with soap and water. As is characteristic of molded plastics, the colors extend throughout the material, and consequently, if the surface becomes worn away, the colors will still be the same as the original links.

I claim as my invention:

1. An ornamental article comprising a plurality of alternately disposed main and connecting links, said main links each having longitudinally extending bar portions formed integral near their opposite ends with pivot portions, said connecting links having a pair of outwardly extending ribs at each end thereof which are spaced apart to receive between them said pivot portions of adjacent links, the outer edges of said ribs extending toward each other to retain said pivot portions in place between said ribs, to permit turning of said main and connecting links relatively to each other.

2. An ornamental article comprising a plurality of alternately disposed main and connecting links formed of molded plastic material, said main links each having longitudinally extending bar portions spaced apart and connected at their ends with transverse pivot portions formed integral with said bar portions, said connecting links having ribs at opposite ends thereof extending transversely of the length of said article and which are arranged in pairs and which are shaped to form between them undercut grooves in which said pivot portions of said main links are retained and into which said pivot portions may be inserted through the open sides of said grooves by flexing said ribs.

3. An ornamental article comprising a plurality of alternately disposed main and connecting links, said main links each having longitudinally extending bar portions formed integral near their opposite ends with pivot portions, said connecting links having undercut open-sided grooves formed in the end portions thereof into which the pivot portions of two adjacent main links extend, the open sides of said grooves being of less width than the diameter of said pivot portions and large enough so that said pivot portions may be inserted into their operative positions by flexing the material of said connecting links.

4. An ornamental article comprising a plurality of alternately disposed main and connecting links formed of plastic material, said main links each having longitudinally extending bar portions spaced apart and connected at their ends by pivot portions formed integral with said bar portions, said bar portions having grooves in the back faces thereof to enable the main links to be molded with smooth outer surfaces and with the irregular surfaces formed by means of knock-out pins located within said grooves, and connecting links engaging said pivot portions of the main links.

5. A garment belt comprising a portion made of alternately arranged main links and connecting links pivotally connected to each other, buckles on the opposite ends of said belt and each having hooks, and an endless chain, any of the links of which may be engaged by said hooks to connect the ends of said belt and to vary the length of the belt, said chain being made of a plurality of alternately arranged rigid links and spiral links, each adjacent pair of rigid links being connected by a spiral link having at least two turns of the spiral arranged in contact with each other and cemented together.

6. A garment belt comprising a portion made of alternately arranged main links and connecting links pivotally connected to each other, said main links having pivot portions near the ends thereof and said connecting links having undercut grooves formed in a face thereof, into which said pivot portions may be pressed and in which they are pivotally held, and buckles for the ends of said belt, one end of each of said buckles having an undercut groove formed therein in which said pivot portions of adjacent main links are arranged, and means for connecting said end buckles to each other.

7. An ornamental belt made of a series of connected links of molded plastic material and having end buckles secured to the ends of said series of links, hooks formed on said end buckles by means of which the buckles may be connected with each other, said buckles each having a hole formed therein extending from the inner face of the buckle into proximity to the outer face thereof, and each of said hooks having a part fitting into said hole and cemented in place therein.

CARL G. MARQUARDT.

REFERENCES CITED

The following references are of record in the file of this patent:

UNITED STATES PATENTS

| Number | Name | Date |
|---|---|---|
| Re. 5,574 | Cottle | Feb. 24, 1874 |
| 332,053 | Cole | Dec. 8, 1885 |
| 615,133 | Bienenzucht | Nov. 23, 1898 |
| 1,173,427 | Heyman | Feb. 29, 1916 |
| 1,787,405 | Danserau | Dec. 30, 1930 |
| 1,836,955 | Carlson | Dec. 15, 1931 |
| 2,388,752 | Loos | Nov. 13, 1945 |